US012661683B2

(12) United States Patent

Takagi et al.

(10) Patent No.: US 12,661,683 B2

(45) Date of Patent: Jun. 23, 2026

(54) TRACK GENERATION DEVICE AND FLUID APPLICATION SYSTEM

(71) Applicant: DENSO CORPORATION, Kariya-city (JP)

(72) Inventors: Kazuki Takagi, Kariya-city (JP); Tomoaki Ozaki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 407 days.

(21) Appl. No.: 18/515,081

(22) Filed: Nov. 20, 2023

(65) Prior Publication Data

US 2024/0165653 A1 May 23, 2024

(30) Foreign Application Priority Data

Nov. 22, 2022 (JP) ................................ 2022-186708

(51) Int. Cl.
*B05C 11/10* (2006.01)
*B05C 5/02* (2006.01)

(52) U.S. Cl.
CPC ............ *B05C 11/1002* (2013.01); *B05C 5/02* (2013.01)

(58) Field of Classification Search
CPC ... B05C 11/1002; B05C 5/02; B05C 11/1021; B05C 5/0216; B25J 9/1679; B25J 9/163; B25J 11/0075
See application file for complete search history.

(56) References Cited

U.S. PATENT DOCUMENTS

2019/0232304 A1* 8/2019 Grimm ................. B05B 12/126

FOREIGN PATENT DOCUMENTS

JP H05-104044 A 4/1993
JP 2012-045476 A 3/2012

OTHER PUBLICATIONS

U.S. Appl. No. 18/515,093, filed Nov. 20, 2023, Track Generation Device and Fluid Application System, 36 pgs.

* cited by examiner

*Primary Examiner* — Jacob S. Scott
*Assistant Examiner* — Miraj T. Patel
(74) *Attorney, Agent, or Firm* — Precision Patents, P.C.

(57) ABSTRACT

A track generation device includes a storage unit and a track generation unit. The storage unit stores, for each of a plurality of basic pattern tracks, a plurality of parameters of a physical model that represents a physical behavior from discharge of a fluid to application of the fluid. Each of the plurality of basic pattern tracks includes at least a curved track. The physical model is learned based on an actual track of a fluid discharge unit and an actual application track of the fluid when the fluid discharge unit discharges the fluid while moving in such a manner that an application track of the fluid becomes each of the plurality of basic pattern tracks. The track generation unit generates a track of the fluid discharge unit corresponding to a target application track using the physical model.

9 Claims, 8 Drawing Sheets

| SHAPE | RADIUS [mm] | PARAMETER : a0 |
|---|---|---|
| BASIC PATTERN TRACK A | 5 | 1.0 |
| BASIC PATTERN TRACK B | 10 | 1.0 |
| BASIC PATTERN TRACK C | 15 | 1.0 |

| SHAPE | RADIUS [mm] | PARAMETER : a0 |
|---|---|---|
| BASIC PATTERN TRACK A | 5 | 0.5 |
| BASIC PATTERN TRACK B | 10 | 0.8 |
| BASIC PATTERN TRACK C | 15 | 1.1 |

| SHAPE | RADIUS [mm] | PARAMETER : a0 |
|---|---|---|
| BASIC PATTERN TRACK A | 5 | 0.5 |
| BASIC PATTERN TRACK B | 10 | 0.8 |
| BASIC PATTERN TRACK C | 15 | 1.1 |

| SHAPE | RADIUS [mm] | PARAMETER : a0 |
|---|---|---|
| PATTERN TRACK 1 | 7.5 | 0.65 |
| PATTERN TRACK 2 | 15 | 1.1 |

TRACK GENERATION DEVICE AND FLUID APPLICATION SYSTEM

CROSS REFERENCE TO RELATED APPLICATION

The present application claims the benefit of priority from Japanese Patent Application No. 2022-186708 filed on Nov. 22, 2022. The entire disclosure of the above application is incorporated herein by reference.

TECHNICAL FIELD

The present disclosure relates to a track generation device configured to generate a track of a fluid discharge unit that discharges a fluid, and a fluid application system including the track generation device.

BACKGROUND

Conventionally, there has been known a discharge amount control device configured to detect a change in an application speed of an application nozzle that discharges a fluid and control a discharge amount of the fluid based on the detected value.

SUMMARY

The present disclosure provides a track generation device including a storage unit and a track generation unit. The storage unit stores, for each of a plurality of basic pattern tracks, a plurality of parameters of a physical model that represents a physical behavior from discharge of a fluid to application of the fluid. Each of the plurality of basic pattern tracks includes at least a curved track. The physical model is learned based on an actual track of a fluid discharge unit and an actual application track of the fluid when the fluid discharge unit discharges the fluid while moving in such a manner that an application track of the fluid becomes each of the plurality of basic pattern tracks. The track generation unit generates a track of the fluid discharge unit corresponding to a target application track using the physical model. The present disclosure also provides a fluid application system including the track generation device and the fluid discharge unit.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
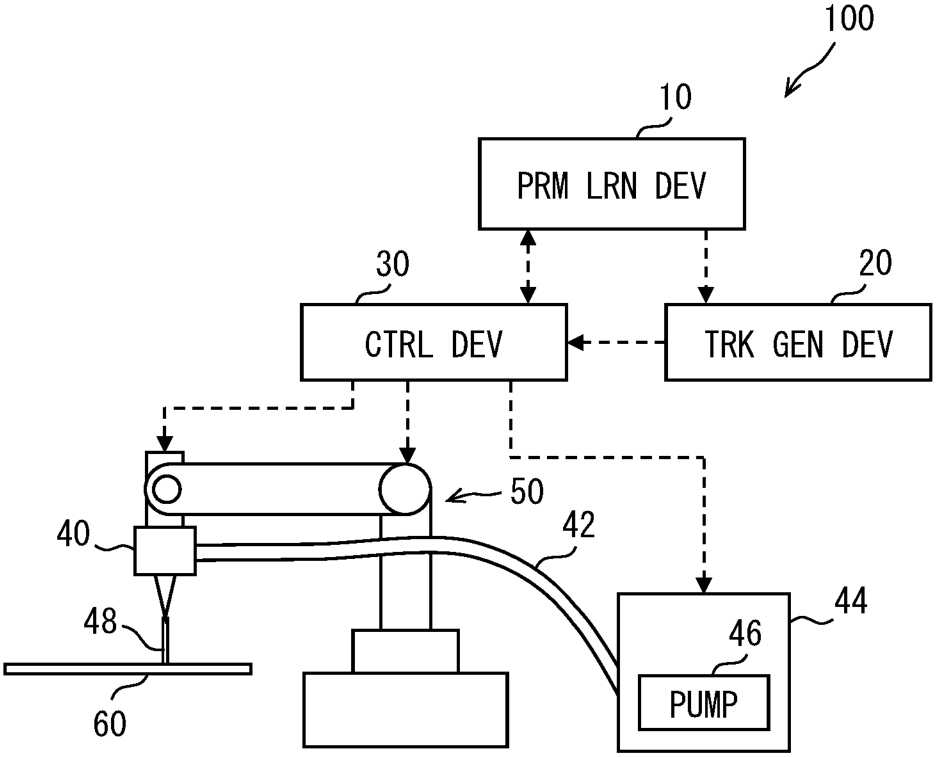
FIG. 1 is a configuration diagram schematically illustrating an overall configuration of a fluid application system including a track generation device according to an embodiment.

Next, a relevant technology is described only for understanding the following embodiments. A discharge amount control device according to the relevant technology detects a change (decrease or increase) in an application speed of an application nozzle that discharges a highly viscous fluid (for example, an adhesive), and controls the discharge amount based on the detected value.

In the discharge amount control device described above, since the application speed of the application nozzle becomes slow in a corner application portion, the discharge amount of the adhesive is reduced when the application nozzle moves from a straight application portion to the corner application portion, and the discharge amount of the adhesive is increased when the application nozzle moves from the corner application portion to the straight application portion. In such a case, it is possible to eliminate excess or deficiency of the adhesive application over the entire application portion.

In a case where the fluid discharged by the fluid discharge unit such as the application nozzle has a viscosity sufficient to maintain a state in which the fluid is connected from the fluid discharge unit to a surface of an object, there is a possibility that the fluid cannot be applied along a target application track only by determining a track of the fluid discharge unit according to the target application track. This is because the application position of the fluid discharged from the fluid discharge unit is affected by the movement of the fluid discharge unit after being discharged. For example, in a case where the fluid discharge unit changes the track from a straight track to a curved track along the target application track, the application track of the discharged fluid may curve inward from the target application track due to the influence of the fluid discharge unit moving along the curved track.

A track generation device according to an aspect of the present disclosure is configured to generating a track of a fluid discharge unit that discharges a fluid for applying the fluid to a surface of an object along a target application track. The fluid discharged by the fluid discharge unit has a viscosity that maintains a state in which the fluid is connected from the fluid discharge unit to the surface of the object. The track generation device includes a storage unit and a track generation unit. The storage unit is configured to store, for each of a plurality of basic pattern tracks, a plurality of parameters of a physical model that represents a physical behavior from discharge of the fluid to application of the fluid that is discharged. Each of the plurality of basic pattern tracks includes at least a curved track. The physical model is learned based on an actual track of the fluid discharge unit and an actual application track of the fluid when the fluid discharge unit discharges the fluid while moving in such a manner that an application track of the fluid becomes each of the plurality of basic pattern tracks. The plurality of parameters of the physical model includes at least a first parameter that is a coefficient of a moving direction vector of the fluid discharge unit and a second parameter that is a coefficient of a falling direction vector of the fluid that is discharged from the fluid discharge unit. The track generation unit is configured to generate the track of the fluid discharge unit corresponding to the target application track using the physical model that uses the plurality of parameters stored in the storage unit upon reception of the target application track.

As described above, in the track generation device according to the present disclosure, the parameters of the physical model representing the physical behavior from the discharge of the fluid to the application of the discharged fluid are learned based on the actual track of the fluid discharge unit and the actual application track of the fluid for each of the plurality of basic pattern tracks, and are stored in the storage unit. Therefore, by using the physical model that uses the parameters stored in the storage unit, it is possible to generate the track of the fluid discharge unit corresponding to the target application track, that is, capable of obtaining the target application track.

A fluid application system according to another aspect of the present disclosure includes a fluid discharge unit, a track generation device, and a control device. The fluid discharge unit is configured to discharge a fluid for applying the fluid to a surface of an object along a target application track. The fluid discharged by the fluid discharge unit has a viscosity that maintains a state in which the fluid is connected from the fluid discharge unit to the surface of the object. The track generation device is configured to generate a track of the fluid discharge unit, and includes a storage unit and a track generation unit. The storage unit is configured to store, for each of a plurality of basic pattern tracks, a plurality of parameters of a physical model that represents a physical behavior from discharge of the fluid to application of the fluid that is discharged. Each of the plurality of basic pattern tracks includes at least a curved track. The physical model is learned based on an actual track of the fluid discharge unit and an actual application track of the fluid when the fluid discharge unit discharges the fluid while moving in such a manner that an application track of the fluid becomes each of the plurality of basic pattern tracks. The plurality of parameters of the physical model includes at least a first parameter that is a coefficient of a moving direction vector of the fluid discharge unit and a second parameter that is a coefficient of a falling direction vector of the fluid that is discharged from the fluid discharge unit. The track generation unit is configured to generate the track of the fluid discharge unit corresponding to the target application track using the physical model that uses the plurality of parameters stored in the storage unit upon reception of the target application track. The control device is configured to move the fluid discharge unit along the track generated by the track generation device while making the fluid discharge unit discharge the fluid.

According to the above configuration, the fluid application system can apply the fluid to the surface of the object along the target application track even if the fluid has a viscosity sufficient to maintain the state in which the fluid is connected from the fluid discharge unit to the surface of the object.

A track generation device according to another aspect of the present disclosure is configured to generate a track of an application nozzle that discharges a fluid for applying the fluid to a surface of an object along a target application track. The fluid discharged by the application nozzle has a viscosity that maintains a state in which the fluid is connected from the application nozzle to the surface of the object. The track generation device includes a computer configured to store, for each of a plurality of basic pattern tracks, a plurality of parameters of a physical model that represents a physical behavior from discharge of the fluid to application of the fluid that is discharged. Each of the plurality of basic pattern tracks includes at least a curved track. The physical model is learned based on an actual track of the application nozzle and an actual application track of the fluid when the application nozzle discharges the fluid while moving in such a manner that an application track of the fluid becomes each of the plurality of basic pattern tracks. The plurality of parameters of the physical model includes at least a first parameter that is a coefficient of a moving direction vector of the application nozzle and a second parameter that is a coefficient of a falling direction vector of the fluid that is discharged from the application nozzle. The computer is further configured to generate the track of the application nozzle corresponding to the target application track using the physical model that uses the plurality of parameters upon reception of the target application track.

Hereinafter, preferred embodiments of the present disclosure will be described with reference to the drawings. Note that the same or similar components are denoted by the same reference numerals throughout a plurality of drawings, and description thereof may be omitted.

FIG. 1 is a configuration diagram schematically illustrating an overall configuration of a fluid application system 100 including a track generation device 20 according to an embodiment. The fluid application system 100 according to the present embodiment applies a fluid 48, such as an adhesive, to a surface of an object 60, such as a workpiece, in accordance with a target application track. As illustrated in FIG. 1, the fluid 48 has a viscosity that maintains a state of being connected from the application nozzle 40 to the surface of the object 60. The application nozzle 40 corresponds to a fluid discharge unit. The fluid 48 to be applied by the fluid application system 100 according to the present embodiment is not limited to the adhesive. The fluid application system 100 according to the present embodiment can be adopted as long as the fluid 48 has the viscosity as described above.

As illustrated in FIG. 1, the fluid application system 100 includes a parameter learning device (PRM LRN DEV) 10, the track generation device (TRK GEN DEV) 20, a control device (CTRL DEV) 30, the application nozzle 40, a hose 42, a tank 44, a pump 46, a robot 50, and the like.

The application nozzle 40 discharges the fluid 48 from a tip thereof toward the object 60. Inside the application nozzle 40, a control valve for controlling an application flow rate of the fluid 48 is provided. In the present embodiment, the flow rate of the fluid 48 is adjusted by the control valve so that the fluid 48 is discharged from the application nozzle 40 at a constant flow rate. The discharge of the fluid 48 from the application nozzle 40 can be started and ended by the control valve.

The tank 44 stores the fluid 48 while maintaining the viscosity of the fluid 48. The tank 44 is provided with the pump 46 that delivers the fluid 48 in the tank 44 toward the application nozzle 40. When the pump 46 is driven, the fluid 48 is supplied from the tank 44 to the application nozzle 40 via the hose 42.

The robot 50 supports the application nozzle 40 at an end of a robot arm such that the application nozzle 40 is maintained in a state of being perpendicular to the surface of the object 60. The robot 50 moves the application nozzle 40 so that an application track of the fluid 48 discharged from the application nozzle 40 onto the surface of the object 60 matches with a target application track that is instructed. At this time, for example, the robot 50 moves the application nozzle 40 at a constant speed while keeping the height of the application nozzle 40 from the surface of the object 60 constant. In the following description, a track drawn by the movement of the application nozzle 40 is referred to as a nozzle track. However, since the application nozzle 40 is supported by the robot arm, the nozzle track can also be referred to as a robot track.

The control device 30 is configured using a known computer including, for example, a CPU, a ROM, a RAM, and the like. The control device 30 outputs control signals to various actuators of the robot 50 by executing a program stored in the ROM, for example, and controls the posture and the moving direction of the robot 50. Specifically, the control device 30 controls the robot 50 such that the application nozzle 40 moves at a constant speed along the nozzle track generated by the track generation device 20 while maintaining a constant height from the object 60. The control device 30 also controls the start and stop of the discharge of the fluid 48 from the application nozzle 40. A specific control process executed by the control device 30 will be described in detail later.

The track generation device 20 is configured using, for example, a known computer including a CPU, a ROM, a RAM, and the like, similarly to the control device 30. The track generation device 20 executes, for example, a program stored in the ROM to generate a nozzle track corresponding to the target application track using a physical model described later, and provides the nozzle track to the control device 30. A specific control process executed by the control device 30 will be described in detail later.

The parameter learning device 10 is configured using, for example, a known computer including a CPU, a ROM, a RAM, and the like, similarly to the control device 30. The parameter learning device 10 executes, for example, a program stored in the ROM to learn (calculate) parameters of the physical model representing a physical behavior from the discharge of the fluid 48 to the application of the discharged fluid 48 based on an actual track of the application nozzle 40 and an actual application track of the fluid 48 when the fluid 48 is discharged from the application nozzle 40 while moving the application nozzle 40 so that the application track of the fluid 48 becomes a basic pattern track for each of a plurality of basic pattern tracks.

FIG. 1 illustrates an example in which the parameter learning device 10, the track generation device 20, and the control device 30 are respectively configured by separate computers. However, the parameter learning device 10, the track generation device 20, and the control device 30 may be combined and configured by a smaller number of computers.

Figure 2:
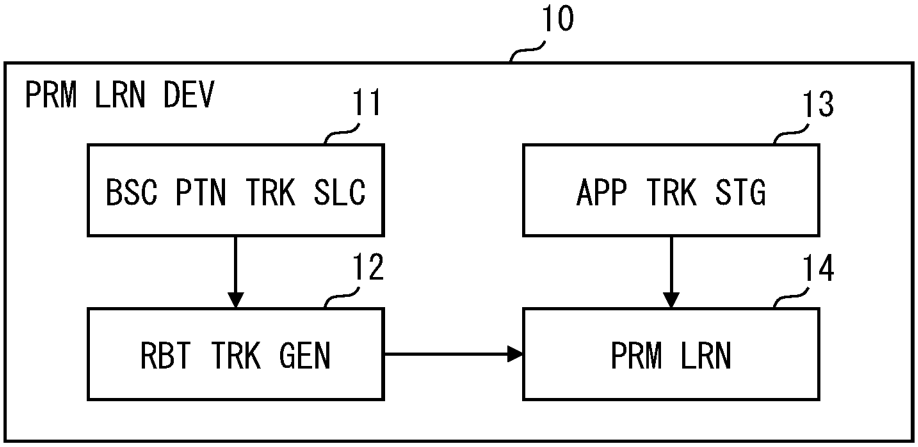
FIG. 2 is a block diagram illustrating various functions performed by a parameter learning device when executing a program.

FIG. 2 is a block diagram illustrating various functions performed by the parameter learning device 10 when executing a program. As illustrated in FIG. 2, the parameter learning device 10 includes a basic pattern track selection unit (BSC PTN TRK SLC) 11, a robot track generation unit (RBT TRK GEN) 12, an application track storage unit (APP TRK STG) 13, and a parameter learning unit (PRM LRN) 14.

The basic pattern track selection unit 11 repeats selection of one basic pattern track from among a plurality of basic pattern tracks in a predetermined order. As a result, all the basic pattern tracks are selected according to the predetermined order. The one basic pattern track selected by the basic pattern track selection unit 11 is output to the robot track generation unit 12.

The robot track generation unit 12 generates a nozzle track corresponding to (for example, matching with) the basic pattern track output from the basic pattern track selection unit 11. The robot track generation unit 12 outputs the generated nozzle track to the control device 30. The control device 30 controls the robot 50 to move the application nozzle 40 while discharging the fluid 48 from the application nozzle 40 according to the nozzle track input from the robot track generation unit 12. The control device 30 detects the application track of the fluid 48 that is applied to the object 60 by a detector such as a camera (not illustrated). The control device 30 outputs the detected application track to the parameter learning device 10.

The application track storage unit 13 of the parameter learning device 10 stores the application track output from the control device 30. The storing of the application track is performed for each basic pattern track. The application track storage unit 13 outputs the stored application track to the parameter learning unit 14. The parameter learning unit 14 learns (calculates) the parameters of the physical model representing the physical behavior from the discharge of the fluid 48 from the application nozzle 40 to the application of the discharged fluid 48 using the actual track of the application nozzle 40 received from the robot track generation unit 12 and the actual application track received from the application track storage unit 13 as learning data. The parameters learned for each basic pattern track are output to the track generation device 20.

Figure 3A:
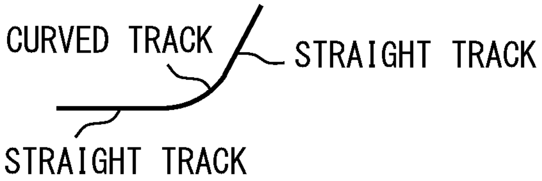
FIGS. 3A to 3D are diagrams illustrating examples of basic pattern tracks.
Figure 3B:
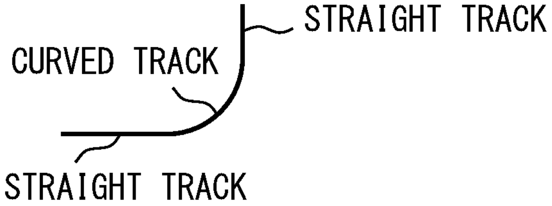
Figure 3C:
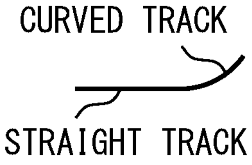
Figure 3D:
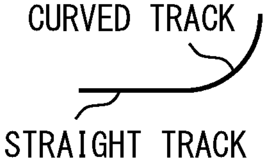

FIGS. 3A to 3D show examples of the basic pattern tracks. For example, FIG. 3A and FIG. 3B illustrate examples in which each basic pattern track is configured by a combination of a straight track, a curved track, and another straight track arranged in this order. A track change angle by the curved track of FIG. 3A is about 60 degrees, and a radius is about 15 mm. A track change angle by the curved track of FIG. 3B is about 90 degrees, and a radius is about 10 mm. FIG. 3C and FIG. 3D illustrate examples in which each basic pattern track is configured by a combination of a straight track and a curved track. A track change angle by the curved track of FIG. 3C is about 60 degrees, and a radius is about 15 mm. A track change angle by the curved track of FIG. 3D is about 90 degrees, and a radius is about 10 mm.

As described above, each of the basic pattern tracks may be configured by a combination of a straight track, a curved track, and another straight track arranged in this order, or may be configured by a combination of a straight track and a curved track. The plurality of basic pattern tracks may include a basic pattern track configured only by a curved track. When the plurality of basic pattern tracks includes the basic pattern track configured only by a curved track, when a given target application track is divided into pattern tracks similar to the basic pattern tracks, even if the target application track includes an S-shaped curve, the S-shaped curve can be appropriately divided into pattern tracks.

As described above, the plurality of basic pattern tracks is set such that the radius and/or the track change angle of the curved track are different from each other. Thus, as will be described in detail later, even when the target application track includes curved tracks of various shapes, the parameters to be used for the physical model can be determined so as to conform to the curved tracks of various shapes based on the parameters learned based on the plurality of basic pattern tracks. As a result, regardless of the shapes of the curved tracks included in the target application track, it is possible to accurately generate the track of the application nozzle 40 capable of applying the fluid 48 along the curved tracks included in the target application track.

When the parameters of the physical model are learned based on the plurality of basic pattern tracks, the application conditions such as the type of the fluid 48, the flow rate of the fluid 48, the moving speed of the application nozzle 40, and the height of the application nozzle 40 from the target object 60 are constant. When at least one of these application conditions is changed, it is preferable that the parameters of the physical model are separately learned based on a plurality of basic pattern tracks under the changed application conditions.

Figure 4:
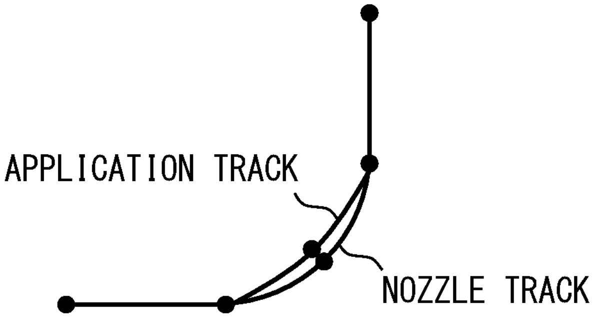
FIG. 4 is a diagram illustrating an example in which an application track of a fluid is deviated from a track of an application nozzle.

As described above, each of the basic pattern tracks includes at least a curved track. As shown in FIG. 4, when the application nozzle 40 moves along a straight track in the target application track, the obtained application track matches with the nozzle track. However, when the application nozzle 40 moves along a curved track in the target application track, the obtained application track may curve inward with respect to the nozzle track. This is because since the fluid 48 discharged from the application nozzle 40 is connected to the application nozzle 40, the discharged fluid 48 is pulled to the inside of the curved track of the application nozzle 40 due to the influence of the application nozzle 40 moving along the curved track. Therefore, when the target application track includes a curved track, even if the track of the application nozzle 40 is simply determined so as to match with the target application track, there may be a case where the obtained application track does not match with the target application track.

Therefore, in the present embodiment, as described above, the actual application track of the fluid 48 when the fluid 48 is discharged from the application nozzle is detected by the detector such as the camera while moving the application nozzle 40 such that the application track of the fluid 48 becomes the basic pattern track for each of the plurality of basic pattern tracks including at least the curved track. Then, based on the actual track of the application nozzle 40 and the actual application track of the fluid 48, the parameters of the physical model representing the physical behavior from the discharge of the fluid 48 to the application of the discharged fluid 48 are learned (calculated). When a curved track is included in the given target application track, a parameter in the physical model that most appropriately represents a physical behavior from the discharge of the fluid 48 to the application of the discharged fluid 48 on the curved track is determined based on the learned parameter. Therefore, by using the physical model using the determined parameters, it is possible to generate the track of the application nozzle 40 capable of applying the fluid 48 along the curved track in the target application track.

Figure 5:
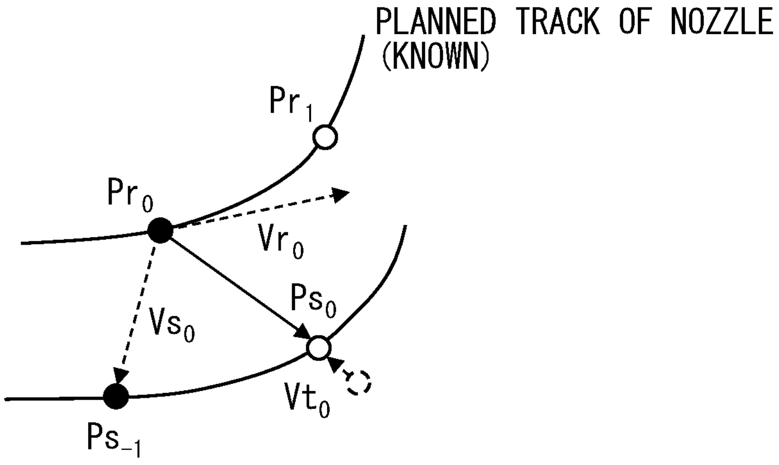
FIG. 5 is a diagram for explaining a physical model according to the embodiment.

FIG. 5 is a diagram for explaining a physical model according to the present embodiment. The physical model in the present embodiment can be represented by, for example, the following Equation 1.

$$Ps_0=Pr_0+(a_0\times Vr_0+b_0\times Vs_0+c_0\times Vt_0)\times ts \quad \text{[Equation 1]}$$

In Equation 1, $Ps_0$ is an application position of the fluid 48 to be estimated. $Pr_0$ is a nozzle position at the time of discharging the fluid 48 (in other words, at a time point at which the estimation of the application position is performed). $Vr_0$ is a moving direction vector of the application nozzle 40, and $a_0$ is a coefficient of the moving direction vector of the application nozzle 40, which corresponds to a first parameter. $Vs_0$ is a falling direction vector of the fluid 48 discharged from the application nozzle 40, and $b_0$ is a coefficient of the falling direction vector of the fluid 48, which corresponds to a second parameter. $Vt_0$ is a post-application vector that acts on the fluid 48 after application in a direction to shift the application position, and $c_0$ is a coefficient of the post-application vector, which corresponds to a third parameter. Since the fluid 48 is connected to the application nozzle 40, the post-application vector $Vt_0$ may be generated by twisting the fluid 48 due to the movement of the application nozzle 40 along the curved track even after the fluid 48 is applied to the surface of the object 60. In addition, ts is a time interval (time step) corresponding to a step size when the application track is estimated. The time step ts is set to an appropriate value in consideration of the moving speed of the application nozzle 40. For example, when the moving speed of the application nozzle 40 is 100 mm/s, if it is desired to estimate the application track at intervals of 1 mm, the time step ts is 0.01 (s).

The falling direction vector $Vs_0$ of the fluid 48 may be set so as to be directed from the nozzle position $Pr_0$ to the estimated application position estimated in the previous time step, for example, $Vs_{-1}$. At this time, whether the estimated application position $Vs_{-1}$ estimated in the last time step is appropriate or the estimated application positions $Vs_{-2}$, $Vs_{-3}$, . . . estimated in earlier time steps are appropriate as the estimated application position estimated at the previous time step may be determined simultaneously with the learning of the first to third parameters $a_0$, $b_0$, and $c_0$ described above.

In the physical model, since the degree of influence of the post-application vector $Vt_0$ on the application position is relatively small, a physical model in which the term of the post-application vector $Vt_0$ is omitted may be used. Furthermore, in the example described above, the physical model is modeled using the movement direction vector $Vr_0$, the falling direction vector $Vs_0$, and the like at the nozzle position $Pr_0$ at the time of discharging the fluid 48. However, in the modeling, each vector may be defined with a temporal midpoint $Pr_{0,1}$ between the nozzle position $Pr_0$ and the nozzle position $Pr_1$ at the time when the discharged fluid 48 is applied as a reference position. Alternatively, the respective vectors at a plurality of positions such as the nozzle position $Pr_0$ and the temporal midpoint $Pr_{0,1}$ may be added together.

When the first to third parameters $a_0$, $b_0$, and $c_0$ of the physical model are learned, the speed of the application nozzle 40 may be simply input to the moving direction vector $Vr_0$, the falling direction vector $Vs_0$, and the post-application vector $Vt_0$. Even in this case, the degree of influence of each of the vectors $Vr_0$, $Vs_0$, and $Vt_0$ can be adjusted by the first to third parameters $a_0$, $b_0$, and $c_0$.

As described above, in the present embodiment, focusing on the physical behavior from the discharge of the fluid 48 to the application of the discharged fluid 48, the physical behavior is modeled. Then, the parameter learning device 10 learns the first to third parameters $a_0$, $b_0$, and $c_0$ of the physical model so that the relationship between the actual track of the application nozzle 40 and the actual application track of the fluid 48 can be reproduced by using, as learning data, the actual track of the application nozzle 40 and the actual application track of the fluid 48 when the fluid 48 is discharged from the application nozzle 40 while moving the application nozzle 40 so that the application track of the fluid 48 becomes the basic pattern track for each of the plurality of basic pattern tracks including the curved track. As a method for learning the first to third parameters $a_0$, $b_0$, and $c_0$, for example, a loss function L representing a sum of differences between the application track estimated by the physical model and the actual application track is used. In this case, all combinations within the respective search ranges of the first to third parameters $a_0$, $b_0$, and $c_0$ are searched, and a combination in which the loss function L is minimized is calculated. Accordingly, the parameter learning device 10 can determine the physical model capable of simulating the physical behavior of the fluid 48 with respect to each of the basic pattern tracks.

Figure 6:
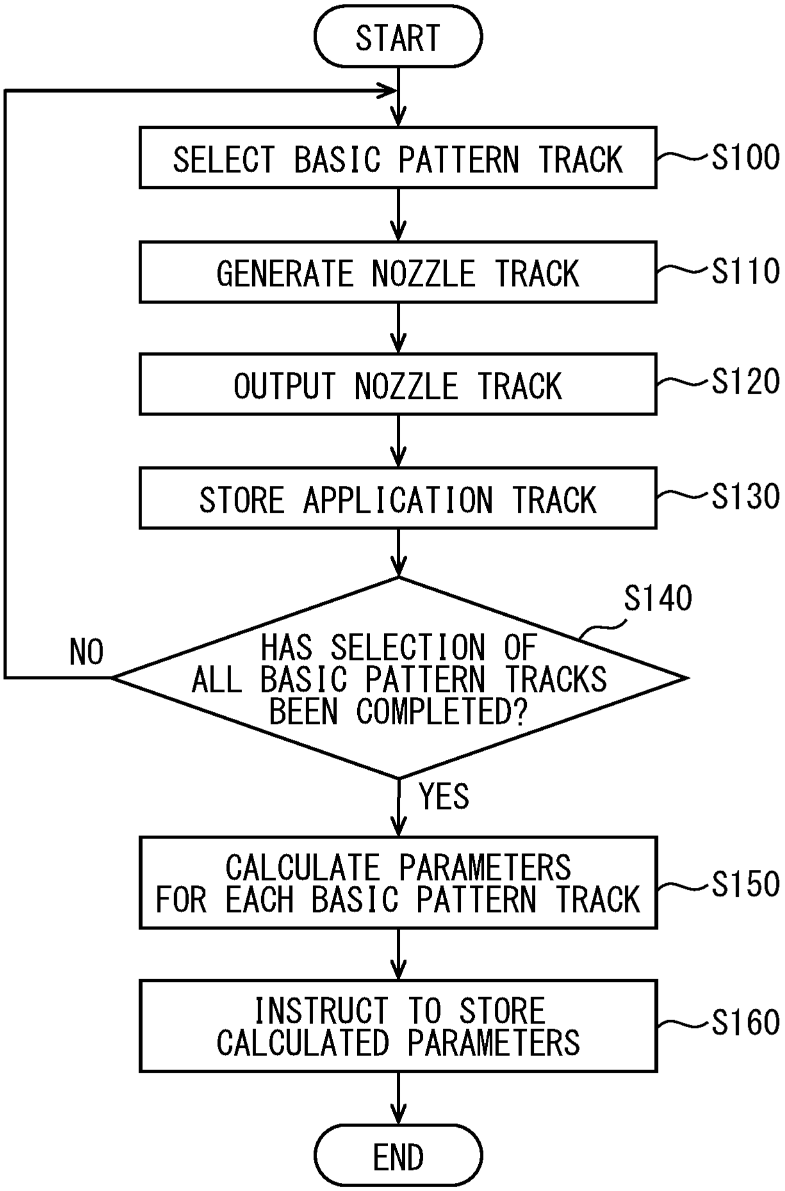
FIG. 6 is a flowchart illustrating a process for learning parameters of the physical model, which is executed by the parameter learning device.

Next, a process for learning the parameters of the physical model, which is executed by the parameter learning device 10, will be described with reference to the flowchart in FIG. 6.

In S100, the basic pattern track selection unit 11 selects one basic pattern track from the plurality of basic pattern tracks in the predetermined order. In S110, the robot track generation unit 12 generates the nozzle track corresponding to (for example, matching with) the basic pattern track selected by the basic pattern track selection unit 11. In S120, the robot track generation unit 12 outputs the generated nozzle track to the control device 30. Accordingly, the control device 30 controls the robot 50 to move the application nozzle 40 while discharging the fluid 48 from the application nozzle 40 according to the nozzle track input from the robot track generation unit 12.

In S130, the application track storage unit 13 stores the application track detected by the detector and output from the control device 30. In S140, the basic pattern track selection unit 11 determines whether the selection of all the basic pattern tracks has been completed. In this determination process, when it is determined that the selection of all the basic pattern tracks has been completed, the process proceeds to S150. On the other hand, when it is determined that the selection of all the basic pattern tracks has not been completed, the process returns to S100.

In S150, the parameter learning unit 14 learns (calculates), for each of the basic pattern tracks, the parameters of the physical model representing the physical behavior from the discharge of the fluid 48 from the application nozzle 40 to the application of the discharged fluid 48, using the actual track of the application nozzle 40 received from the robot track generation unit 12 and the actual application track received from the application track storage unit 13 as the learning data. In S160, the parameter learning unit 14 instructs the track generation device 20 to store the parameters learned for each of the basic pattern tracks.

Figures 7A, 7B, 8:
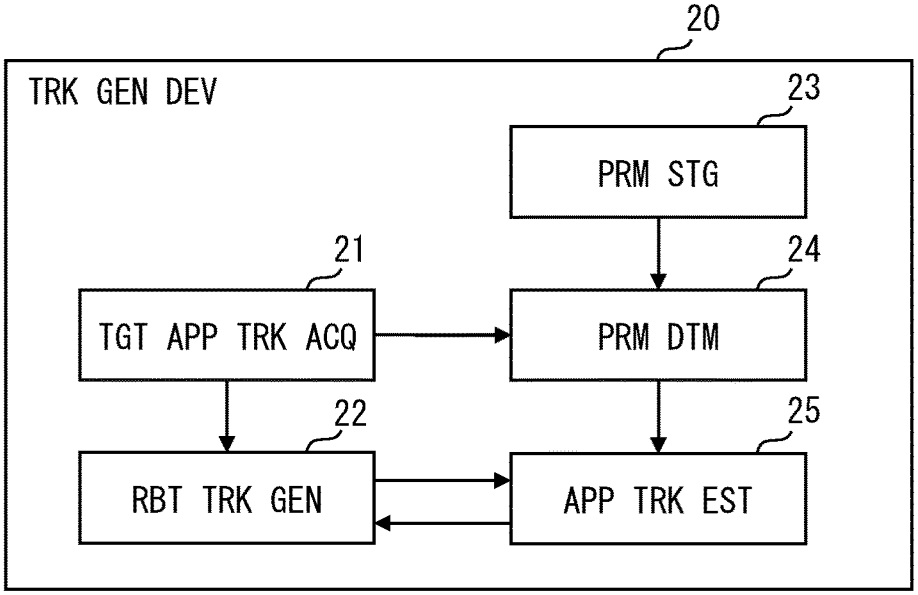
FIGS. 7A and 7B are diagrams illustrating examples of calculated parameters of the physical model.
FIG. 8 is a block diagram illustrating various functions performed by a track generation device when executing a program.

FIG. 7A and FIG. 7B illustrate examples of the first parameter $a_0$ learned by the parameter learning unit 14. In the example illustrated in FIG. 7A, a plurality of basic pattern tracks, that is, a basic pattern track A, a basic pattern track B, and a basic pattern track C include curved tracks having different radii. However, in the example illustrated in FIG. 7A, the first parameter $a_0$ is set to an identical parameter value for the plurality of basic pattern tracks although the radii of the curved tracks are different. On the other hand, in the example illustrated in FIG. 7B, the first parameter $a_0$ is set to different parameter values for the plurality of basic pattern tracks having different radii of curved tracks.

As described above, the first parameter $a_0$ may be set to the identical parameter value or different parameter values for the plurality of basic pattern tracks even though the radii of the curved tracks are different depending on the type of the fluid 48 and the application conditions such as the speed of the application nozzle 40. The same applies to the second parameter $b_0$ and the third parameter $c_0$.

Next, the track generation device 20 will be described. FIG. 8 is a block diagram illustrating various functions performed by the track generation device 20 when executing the program. As illustrated in FIG. 8, the track generation device (TRK GEN DEV) 20 includes a target application track acquisition unit (TGT APP TRK ACQ) 21, a robot track generation unit (RBT TRK GEN) 22, a parameter storage unit (PRM STG) 23, a parameter determination unit (PRM DTM) 24, and an application track estimation unit (APP TRK EST) 25.

The target application track acquisition unit 21 acquires the target application track of the fluid 48 applied to the surface of the object 60. The target application track acquisition unit 21 outputs the acquired target application track to the robot track generation unit 22 and the parameter determination unit 24. The target application track is input to the track generation device 20 by an operator, for example. Alternatively, the target application track may be set by reading the target track described in a CAD model of an application component.

When the difference between the nozzle track matching with the target application track input from the target application track acquisition unit 21 or the application track estimated by the application track estimation unit 25 and the target application track exceeds a predetermined allowable range, the robot track generation unit 22 generates the nozzle track for reducing the difference. The robot track generation unit 22 outputs the generated nozzle track to the application track estimation unit 25. When the difference between the application track estimated by the application track estimation unit 25 and the target application track falls within the predetermined allowable range, the robot track generation unit 22 outputs the nozzle track used for the estimation of the application track to the control device 30.

The parameter storage unit 23 stores the parameters received from the parameter learning device 10 and learned for each of the basic pattern tracks. The parameter determination unit 24 divides the target application track received from the target application track acquisition unit 21 into pattern tracks similar to the basic pattern tracks. Then, for each of the divided pattern tracks, the parameter determination unit 24 determines parameters to be used for the physical model based on the parameters set for each of the basic pattern tracks stored in the parameter storage unit 23.

The application track estimation unit 25 estimates, for each of the divided pattern tracks, the application track of the fluid 48 corresponding to the nozzle track input from the robot track generation unit 22, that is, obtained by the nozzle track, using the physical model that uses the parameters determined by the parameter determination unit 24.

Figures 9, 10A, 10B:
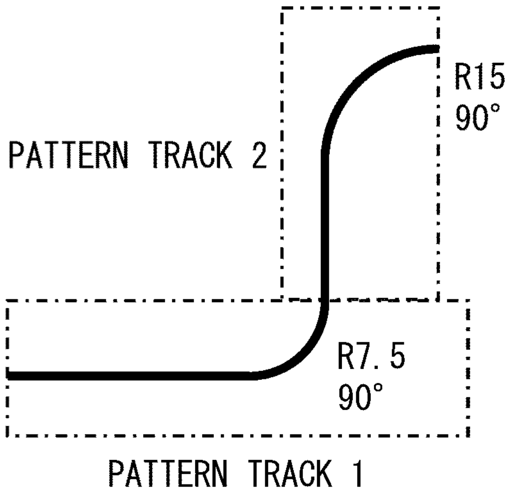
FIG. 9 is a diagram illustrating an example of dividing a target application track into pattern tracks similar to basic pattern tracks.
FIGS. 10A and 10B are diagrams illustrating an example in which parameters corresponding to pattern tracks are obtained by interpolation from parameters corresponding to basic pattern tracks in a case where a divided pattern track has a curved track having a radius different from radii of curved tracks of the basic pattern tracks.

FIG. 9 is a diagram illustrating an example in which the parameter determination unit 24 divides the target application track into pattern tracks similar to the basic pattern tracks. In the example illustrated in FIG. 9, a part of the target application track is divided into a pattern track 1 and a pattern track 2. In this way, the target application track is divided into a plurality of pattern tracks such that each of the pattern tracks includes one curved track. From another point of view, the target application track is divided into a plurality of pattern tracks so that the target application track is obtained by connecting the plurality of pattern tracks.

In the example illustrated in FIG. 9, the pattern track 1 includes a straight track and a curved track having a radius of 7.5 mm and a track change angle of 90 degrees. The pattern track 2 includes a straight track and a curved track having a radius of 15 mm and a track change angle of 90 degrees. It should be noted that various forms are conceivable for the division of the target application track as shown in FIG. 9. For example, the pattern track 1 and the pattern track 2 may be divided at a portion of the straight track. In this case, the pattern track 1 has a shape including a straight track, a curved track, and another straight track arranged in this order. The pattern track 2 has a shape including a straight track and a curved track.

FIG. 10A is a diagram illustrating examples of the parameters for each of the plurality of types of basic patterns stored in the parameter storage unit 23. Although only the first parameter $a_0$ is illustrated in FIG. 10A, this is for convenience of description. Similarly to the first parameter $a_0$, the second and third parameters $b_0$ and $c_0$ are also stored in the parameter storage unit 23.

When a part of the target application track is divided into the pattern track 1 and the pattern track 2 illustrated in FIG. 9, the parameter determination unit 24 determines parameters of the physical model to be used for the pattern track 1 and parameters of the physical model to be used for the pattern track 2 on the basis of the parameters for each of the plurality of types of basic patterns as illustrated in FIG. 10.

For example, in the example illustrated in FIG. 9, the pattern track 1 includes the curved track having the radius of 7.5 mm. However, as shown in FIG. 10A, the first parameter $a_0$ is set to different parameter values for the plurality of basic pattern tracks, and there is no basic pattern track including a curved track having a radius of 7.5 mm. In this way, when the divided pattern track 1 has the curved track having a radius different from the radii of the curved tracks of the basic pattern tracks, the parameter determination unit 24 obtains the first parameter $a_0$ corresponding to the pattern track 1 from the first parameters $a_0$ corresponding to the plurality of basic pattern tracks by interpolation. Specifically, the radius of the curved track of the basic pattern track A is 5 mm, and the parameter value of the first parameter $a_0$ is 0.5. In addition, the radius of the curved track of the basic pattern track B is 10 mm, and the parameter value of the first parameter $a_0$ is 0.8. Therefore, since the radius of the curved track of the pattern track 1 is exactly the middle between the basic pattern tracks A and B, the parameter determination unit 24 determines the parameter value of the first parameter $a_0$ of the pattern track 1 to be 0.65, which is the middle between the parameter values of both the basic pattern tracks A and B, as illustrated in FIG. 10B.

The pattern track 2 includes the curved track having the radius of 15 mm. On the other hand, as shown in FIG. 10A, the parameter storage unit 23 stores the basic pattern track C including the curved track having the radius of 15 mm. Therefore, in this case, the parameter determination unit 24 determines the parameter value of the first parameter $a_0$ of the pattern track 2 to be 1.1, which is the same parameter value as the first parameter $a_0$ of the basic pattern track C.

In the example described above, the radius of the curved track has been focused, but the parameter value may be determined in consideration of the track change angle of the curved track. For example, as illustrated in FIG. 10A, the parameters for the basic pattern tracks having different radii of the curved tracks may be stored for each of the track change angles of the curved tracks. Then, when the track change angle of the curved track included in the target application track is different from the stored track change angles, the stored parameter values may be interpolated and the parameter values may be determined in a manner similar to the above-described method.

FIG. 10A illustrates the example in which the first parameter $a_0$ is set to different parameter values for the plurality of basic pattern tracks having different radii of curved tracks. However, depending on the application conditions, as shown in FIG. 7A, the first parameter a0 may be set to an identical parameter value for the plurality of basic pattern tracks having different radii of curved tracks. In this case, as the parameter value for the basic pattern track including any curved track, the identical parameter value set for the plurality of basic pattern tracks may be used as it is.

Furthermore, in the example described above, the parameters of the physical model for the divided pattern tracks are determined. By using the physical model using the determined parameters, it is possible to accurately generate the nozzle track for obtaining the curved track included in the divided pattern track. As for the straight line track included in the divided pattern track, since the straight track and the nozzle track match with each other, the physical model using the determined parameters may or may not be used when obtaining the nozzle track corresponding to the straight track.

Figure 11:
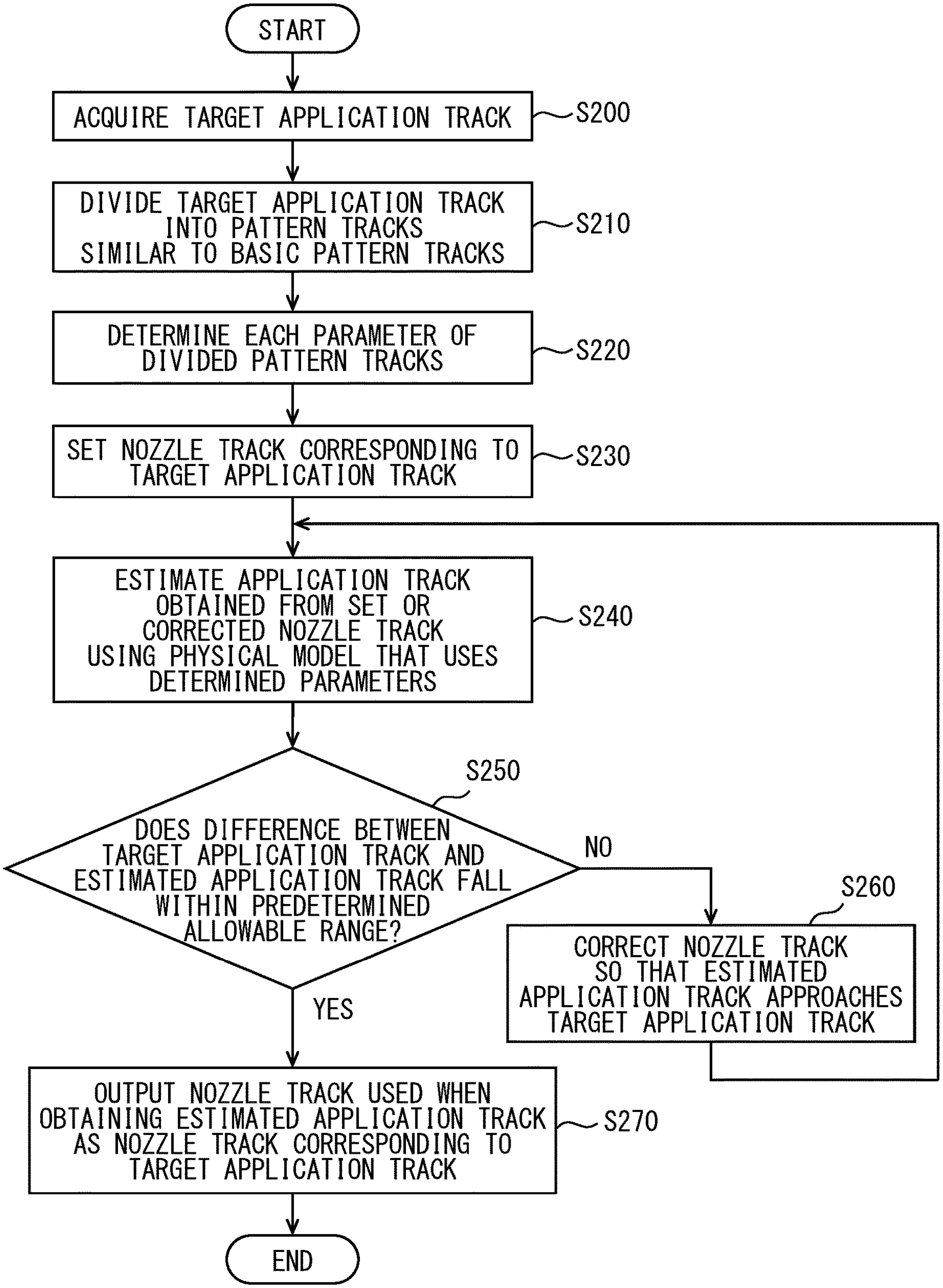
FIG. 11 is a flowchart illustrating a process for generating a nozzle track corresponding to a target application track using the physical model, which is executed by the track generation device.

FIG. 11 is a flowchart illustrating a process for generating the nozzle track corresponding to the target application track using the physical model, which is executed by the track generation device 20.

In S200, the target application track acquisition unit 21 acquires the target application track of the fluid 48 applied to the surface of the object 60. In S210, the parameter determination unit 24 divides the acquired target application track into pattern tracks similar to the basic pattern tracks. Then, in S220, the parameter determination unit 24 determines, for each of the divided pattern tracks, parameters to be used for the physical model based on the parameters set for each of the basic pattern tracks stored in the parameter storage unit 23.

In S230, the robot track generation unit 22 generates the nozzle track that matches with the target application track. Then, in S240, the application track estimation unit 25 estimates, for each of the pattern tracks, the application track obtained from the nozzle track using the physical model that uses the determined parameters.

In S250, the robot track generation unit 22 compares the application track of the fluid 48 estimated by the application track estimation unit 25 with the acquired target application track, and determines whether or not the difference between the estimated application track and the target application track falls within a predetermined allowable range. The comparison between the estimated application track and the target application track may be performed for the entire application track or for each of the divided pattern tracks.

When it is determined that the difference between the estimated application track and the target application track exceeds the predetermined allowable range in S250 described above, the process proceeds to S260, and the robot track generation unit 22 corrects the track of the application nozzle 40 so that the difference between the estimated application track and the target application track becomes small, in other words, so that the estimated application track approaches the target application track. Then, the application track estimation unit 25 acquires the corrected nozzle track from the robot track generation unit 22, and estimates the application track obtained from the corrected track of the application nozzle 40 in the process of S240.

When it is determined in S250 that the difference between the estimated application track and the target application track falls within the predetermined allowable range, the track of the application nozzle 40 used when the estimated application track is obtained is determined as the track (robot track) of the application nozzle 40 corresponding to the target application track in S270. The track of the application nozzle 40 is first generated as a partial track of the application nozzle 40 for obtaining the divided pattern track for each of the divided pattern tracks. Then, the entire track of the application nozzle 40 can be generated by combining the generated partial tracks. The generated entire track of the application nozzle 40 is output to the control device 30.

Figure 12:
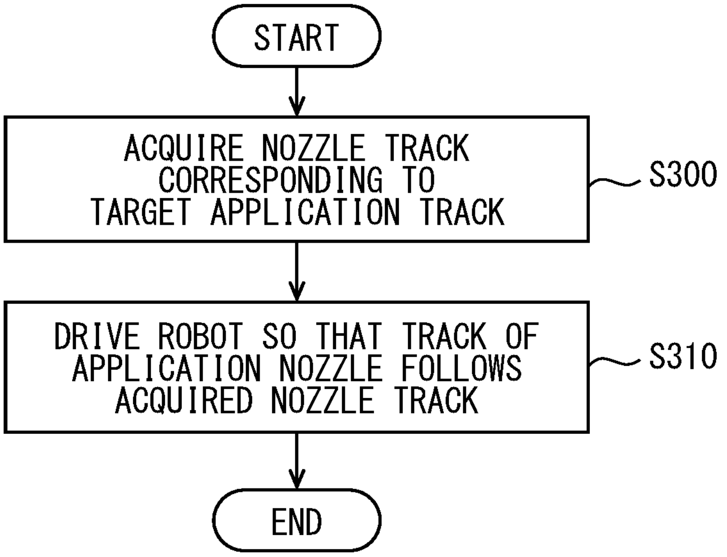
FIG. 12 is a flowchart illustrating a processing for learning parameters of the physical model, which is executed by a control device.

Next, a process for controlling the robot 50 so that the application nozzle 40 moves along the track of the application nozzle 40 generated by the track generation device 20, which is executed by the control device 30, will be described with reference to the flowchart of FIG. 12.

In S300, the control device 30 acquires the track of the application nozzle 40 corresponding to the target application track from the track generation device 20. In S310, the control device 30 outputs a control signal for driving the robot 50 based on the acquired track of the application nozzle 40 so that the track of the application nozzle 40 follows the acquired track. The control device 30 controls the control valve of the application nozzle 40 so that the fluid 48 of a constant flow rate is discharged from the application nozzle 40 while the application nozzle 40 is moved along the acquired nozzle track. Accordingly, the application track of the fluid 48 applied to the target object 60 matches with the target application track.

While preferred embodiments of the present disclosure have been described above, the present disclosure is not limited in any way by the embodiments described above, and may be carried out with various modifications without departing from the scope of the subject matter of the present disclosure.

Figure 13:
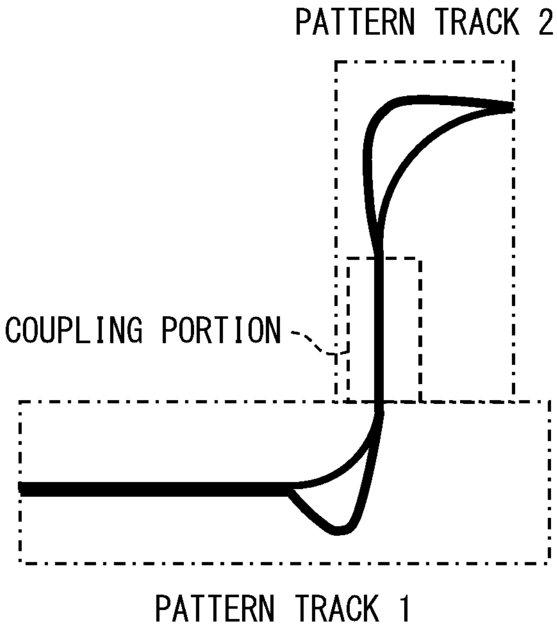
FIG. 13 is a diagram illustrating an example of a nozzle track generated such that a track of an application nozzle extends along a coupling portion between divided pattern tracks.

For example, in the above-described embodiment, when the robot track generation unit 22 generates the nozzle track for obtaining the target application track, as illustrated in FIG. 13, a constraint condition for generating the nozzle track may be provided such that the track of the application nozzle 40 is along a coupling portion between the divided pattern tracks. When there is a straight track between the divided pattern tracks, the straight track becomes the coupling portion. However, the track of the application nozzle 40 does not need to follow the entire straight track, and may follow a part of the straight track. By imposing the above-described constraint condition when generating the nozzle track, it is possible to improve the estimation accuracy of the application track with respect to the nozzle track. The reason is that the nozzle track matches with the basic pattern track at a start point of the basic pattern track used at the time of learning the parameters. Therefore, even for the divided pattern tracks, by matching the nozzle track with the divided pattern tracks at the start point, the application track can be estimated under the same conditions as the basic pattern tracks.

Furthermore, in the above-described embodiment, the robot track generation unit 22 generates the nozzle track that matches with the target application track, the application track estimation unit 25 estimates the application track obtained from the nozzle track, and the robot track generation unit 22 determines the difference between the target application track and the estimated application track. However, in the robot track generation unit 22, it is also possible to directly obtain the track of the application nozzle for obtaining the target application track from the target application track by arithmetic processing using the physical model.

The computer constituting the parameter learning device 10, the track generation device 20, and/or the control device 30 may be realized by a dedicated computer having a processor programmed to execute one or more functions by a computer program. Alternatively, the computer constituting the parameter learning device 10, the track generation device 20, and/or the control device 30 may be realized by a dedicated hardware logic circuit. Alternatively, the computer constituting the parameter learning device 10, the track generation device 20, and/or the control device 30 may be realized by one or more dedicated computers configured by a combination of a processor that executes a computer program and one or more hardware logic circuits. The hardware logic circuit is, for example, an application specific integrated circuit (ASIC) or a field-programmable gate array (FPGA).

The storage medium for storing the computer program is not limited to the ROM. Furthermore, the computer program may be stored in a computer-readable non-transitionary tangible storage medium as an instruction executed by the computer. For example, the program may be stored in a flash memory. Furthermore, the form of the storage medium may be changed as appropriate. The storage medium is not limited to a configuration provided on a circuit board, and may be an optical disk, a hard disk drive, a memory card, or the like.

In the above-described embodiments, the application nozzle 40 corresponds to a fluid discharge unit. The parameter storage unit 23 corresponds to a storage unit.

The robot track generation unit 22, the parameter determination unit 24, and the application track estimation unit 25 correspond to a track generation unit. The parameter determination unit 24 corresponds to a determination unit. The process in S230 correspond to a track setting unit. The process in S260 corresponds to a track correction unit. The process in S270 corresponds to a track determination unit.

What is claimed is:

1. A track generation device for generating a track of a fluid discharge unit that discharges a fluid for applying the fluid to a surface of an object along a target application track, the fluid discharged by the fluid discharge unit having a viscosity that maintains a state in which the fluid is connected from the fluid discharge unit to the surface of the object, the track generation device comprising:

a storage unit configured to store, for each of a plurality of basic pattern tracks, a plurality of parameters of a physical model that represents a physical behavior from discharge of the fluid to application of the fluid that is discharged, each of the plurality of basic pattern tracks including at least a curved track, the physical model being learned based on an actual track of the fluid discharge unit and an actual application track of the fluid when the fluid discharge unit discharges the fluid while moving in such a manner that an application track of the fluid becomes each of the plurality of basic pattern tracks, the plurality of parameters of the physical model including at least a first parameter that is a coefficient of a moving direction vector of the fluid discharge unit and a second parameter that is a coefficient of a falling direction vector of the fluid that is discharged from the fluid discharge unit; and a track generation unit configured to generate the track of the fluid discharge unit corresponding to the target application track using the physical model that uses the plurality of parameters stored in the storage unit upon reception of the target application track.

2. The track generation device according to claim 1, wherein the curved track included in each of the plurality of basic pattern tracks has a radius different from each other, at least one of the first parameter or the second parameter is set to an identical parameter value for the plurality of basic pattern tracks, and the track generation unit is configured to use the identical parameter value for the at least one of the first parameter or the second parameter of the physical model when generating the track of the fluid discharge unit corresponding to the target application track having any curved track.

3. The track generation device according to claim 1, wherein the curved track included in each of the plurality of basic pattern tracks has a radius different from each other, at least one of the first parameter or the second parameter is set to a different parameter value from each other for the plurality of basic pattern tracks, and when generating the track of the fluid discharge unit corresponding to the target application track having any curved track different from the curved track of any one of the plurality of basic pattern tracks, the track generation unit is configured to use, for the at least one of the first parameter or the second parameter of the physical model, a value obtained by interpolation from the different parameter values set for the plurality of basic pattern tracks, as a parameter value corresponding to the any curved track.

4. The track generation device according to claim 1, wherein the physical model further includes a post-application vector that acts on the fluid after application in a direction to shift an application position, and a third parameter that is a coefficient of the post-application vector.

5. The track generation device according to claim 1, wherein the track generation unit includes a determination unit configured to:

divide the target application track into a plurality of pattern tracks similar to one or more of the plurality of basic pattern tracks; and determine, for each of the plurality of pattern tracks, a parameter value of the first parameter and a parameter value of the second parameter to be used for the physical model based on the plurality of parameters stored in the storage unit, and the track generation unit is further configured to:

generate a plurality of partial tracks of the fluid discharge unit corresponding to the plurality of pattern tracks, respectively, using the physical model that uses the parameter value of the first parameter and the parameter value of the second parameter determined by the determination unit for each of the plurality of pattern tracks; and generate an entire track of the fluid discharge unit by combining the plurality of partial tracks.

6. The track generation device according to claim 5, wherein the track generation unit further includes:

a track setting unit configured to initially set the entire track of the fluid discharge unit so as to match with the target application track;

an application track estimation unit configured to estimate the application track of the fluid obtained when the fluid discharge unit is moved along the entire track set by the track setting unit or a plurality of divided tracks obtained by dividing the entire track so as to correspond to the plurality of pattern tracks using the physical model that uses the parameter value of the first parameter and the parameter value of second parameter determined by the determination unit for each of the plurality of pattern tracks;

a track correction unit configured to correct the plurality of divided tracks or the entire track of the fluid discharge unit so that a difference between the application track estimated by the application track estimation unit and the plurality of pattern tracks or the target application track becomes smaller when the difference exceeds a predetermined allowable range; and a track determination unit configured to determine the plurality of divided tracks or the entire track of the fluid discharge unit used when estimating the application track as a part or all of the track of the fluid discharge unit corresponding to the target application track when the difference between the application track estimated by the application track estimation unit and the plurality of pattern tracks or the target application track is within the predetermined allowable range.

7. The track generation device according to claim 5, wherein the plurality of pattern tracks divided by the determination unit is coupled with each other at a coupling portion, and the track generation unit is further configured to generate the track of the fluid discharge unit such that the track of the fluid discharge unit extends along the coupling portion.

8. A fluid application system comprising:

a fluid discharge unit configured to discharge a fluid for applying the fluid to a surface of an object along a target application track, the fluid discharged by the fluid discharge unit having a viscosity that maintains a state in which the fluid is connected from the fluid discharge unit to the surface of the object, a track generation device configured to generate a track of the fluid discharge unit, and including a storage unit configured to store, for each of a plurality of basic pattern tracks, a plurality of parameters of a physical model that represents a physical behavior from discharge of the fluid to application of the fluid that is discharged, each of the plurality of basic pattern tracks including at least a curved track, the physical model being learned based on an actual track of the fluid discharge unit and an actual application track of the fluid when the fluid discharge unit discharges the fluid while moving in such a manner that an application track of the fluid becomes each of the plurality of basic pattern tracks, the plurality of parameters of the physical model including at least a first parameter that is a coefficient of a moving direction vector of the fluid discharge unit and a second parameter that is a coefficient of a falling direction vector of the fluid that is discharged from the fluid discharge unit, and a track generation unit configured to generate the track of the fluid discharge unit corresponding to the target application track using the physical model that uses the plurality of parameters stored in the storage unit upon reception of the target application track; and a control device configured to move the fluid discharge unit along the track generated by the track generation device while making the fluid discharge unit discharge the fluid.

9. A track generation device for generating a track of an application nozzle that discharges a fluid for applying the fluid to a surface of an object along a target application track, the fluid discharged by the application nozzle having a viscosity that maintains a state in which the fluid is connected from the application nozzle to the surface of the object, the track generation device comprising a computer configured to:

store, for each of a plurality of basic pattern tracks, a plurality of parameters of a physical model that represents a physical behavior from discharge of the fluid to application of the fluid that is discharged, each of the plurality of basic pattern tracks including at least a curved track, the physical model being learned based on an actual track of the application nozzle and an actual application track of the fluid when the application nozzle discharges the fluid while moving in such a manner that an application track of the fluid becomes each of the plurality of basic pattern tracks, the plurality of parameters of the physical model including at least a first parameter that is a coefficient of a moving direction vector of the application nozzle and a second parameter that is a coefficient of a falling direction vector of the fluid that is discharged from the application nozzle; and generate the track of the application nozzle corresponding to the target application track using the physical model that uses the plurality of parameters upon reception of the target application track.

* * * * *